United States Patent
Palacios et al.

(10) Patent No.: US 12,182,332 B2
(45) Date of Patent: Dec. 31, 2024

(54) EXTEND THE GAME CONTROLLER FUNCTIONALITY WITH VIRTUAL BUTTONS USING HAND TRACKING

(71) Applicant: Sony Interactive Entertainment Inc., Tokyo (JP)

(72) Inventors: Jorge Arroyo Palacios, San Mateo, CA (US); Chockalingam Ravi Sundaram, San Mateo, CA (US); Mark Anthony, San Mateo, CA (US); Michael Hardisty, San Mateo, CA (US); Sandeep Bansal, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 264 days.

(21) Appl. No.: 17/830,990

(22) Filed: Jun. 2, 2022

(65) Prior Publication Data
US 2023/0393662 A1 Dec. 7, 2023

(51) Int. Cl.
*A63F 13/215* (2014.01)
*A63F 13/211* (2014.01)
(Continued)

(52) U.S. Cl.
CPC ............ *G06F 3/017* (2013.01); *A63F 13/211* (2014.09); *A63F 13/213* (2014.09); *A63F 13/2145* (2014.09); *A63F 13/215* (2014.09); *A63F 13/218* (2014.09); *A63F 13/235* (2014.09); *G06F 3/0304* (2013.01); *G06F 3/0346* (2013.01); *G06N 20/20* (2019.01); *A63F 2300/1031* (2013.01); *A63F 2300/105* (2013.01); *A63F 2300/1056* (2013.01);
(Continued)

(58) Field of Classification Search
CPC ........ A63F 13/20; A63F 13/21; A63F 13/212; A63F 13/213; A63F 13/214; A63F 13/2145; A63F 13/218; A63F 13/219; A63F 13/22; A63F 13/23; A63F 13/24; A63F 13/428; A63F 2300/1031; A63F 2300/105; A63F 2300/1056; A63F 2300/1075; A63F 2300/1081; A63F 2300/1087; G06F 3/017
See application file for complete search history.

(56) References Cited

U.S. PATENT DOCUMENTS 10,824,239 B1  11/2020  Gupta et al.
2009/0327171 A1*  12/2009  Tan ........................ G06F 3/015
                                                      706/12
(Continued)

OTHER PUBLICATIONS

Intl Search Report and Written Opinion, PCT/US2023/066046, dated Jul. 26, 2023, 24 pages.

*Primary Examiner* — Omkar A Deodhar
(74) *Attorney, Agent, or Firm* — PENILLA IP, APC

(57) ABSTRACT

Methods and systems are provided for verifying an input provided at a controller including detecting a finger gesture on a surface of the controller. Responsive to detecting the finger gesture, multi-modal data is collected from a plurality of sensors and components tracking the finger gesture. The multi-modal data is used to generate an ensemble model using machine learning algorithm. The ensemble model is trained in accordance to training rules defined for different finger gestures. An output is identified from the ensemble model for the finger gesture. The output is interpreted to define an input for an interactive application selected for interaction.

19 Claims, 9 Drawing Sheets

(51) Int. Cl.
    *A63F 13/213*     (2014.01)
    *A63F 13/2145*     (2014.01)
    *A63F 13/218*     (2014.01)
    *A63F 13/235*     (2014.01)
    *G06F 3/01*     (2006.01)
    *G06F 3/03*     (2006.01)
    *G06F 3/0346*     (2013.01)
    *G06N 20/20*     (2019.01)

(52) U.S. Cl.
    CPC ........... *A63F 2300/1075* (2013.01); *A63F 2300/1081* (2013.01); *A63F 2300/1087* (2013.01)

(56) References Cited

U.S. PATENT DOCUMENTS

2013/0232095 A1*   9/2013   Tan ................... G06F 3/017
                                                                  706/12
2019/0293462 A1    9/2019   Choi et al.

* cited by examiner

Example of a sound location detection microphone array

EXTEND THE GAME CONTROLLER FUNCTIONALITY WITH VIRTUAL BUTTONS USING HAND TRACKING

TECHNICAL FIELD

The present disclosure relates to identifying input provided by a finger gesture on a hand-held controller and more particularly to using multi-modal data collected from a plurality of sensors and components associated with the hand-held controller for verifying the input provided via the finger gesture.

BACKGROUND OF THE DISCLOSURE

With the growing number of interactive applications and video games available to users on different devices, accurate detection of input provided via the different devices becomes especially important. For example, inputs for a video game provided by a user using a hand-held controller have to be properly identified and correctly interpreted in order to accurately affect a game state of the video game. Relying just on a single mode of data (e.g., image tracking a finger gesture) can lead to erroneous outcome in the video game.

It is in this context that embodiments of the disclosure arise.

SUMMARY

Implementations of the present disclosure relate to systems and methods for providing multi-modal finger tracking to detect and verify finger gestures provided on an input device, such as a hand-held controller. The multi-modal finger tracking and verification ensures that the finger gestures are properly identified and correctly interpreted, thereby reducing errors resulting from relying on just a single mode of tracking. A custom finger tracking model (e.g., ensemble model) is generated and trained using multiple modalities of data captured by a plurality of sensors and components associated with the hand-held controller (simply referred to henceforward as "controller") to increase the accuracy of detecting and interpreting the finger gestures-.

Conventional ways of detecting input relied on a single data source model. For example, the conventional ways relied on a generic camera (i.e., single data source) for detecting and tracking the fingers of a user on the controller. The accuracy of tracking using the single source is less reliable and prone to errors, leading to less than desirable outcomes at an interactive application. To overcome the drawbacks of the conventional ways, multi-modal data is collected from a plurality of sensors and components associated with a controller used for providing inputs and used in verifying the finger gesture detecting at the controller. The collected multi-modal data is used to generate and train a multi-modal data model, which is then used to correctly interpret the finger gesture. As multiple modes of data are used for generating and training the model, the multi-modal data model is also referred to herein as an "ensemble model". The ensemble model is continuously trained in accordance to training rules defined for the different finger gestures using additional multi-modal data collected over time. An output is selected from the ensemble model and used for confirming/verifying the finger gesture detected at the controller. The finger gesture can correspond to a press of a real-button or a press of a virtual-button defined on the controller or an input provided on a touch-screen interface disposed on the controller and the output is identified to correspond with correct interpretation of the finger gesture. The virtual-button can be identified on any surface of the controller where no real-buttons are disposed and the finger gesture on the virtual-button can be defined to be a single tap or a double tap or a press or a swipe in a particular direction, etc.

The model incorporates a multimodal finger tracking technique by taking into consideration several model components like finger tracking using image feed from image capturing devices, inertial measurement unit (IMU) data from IMU sensors disposed in the controller, wireless signals from wireless devices disposed in an environment in which the user is present, data from various sensors, such as distance/proximity sensors, pressure sensors, etc., when generating and training the ensemble model. The ensemble model assists in accurately detecting the finger gestures provided at the controller by tracking and verifying the finger gestures using data from more than one mode.

In one implementation, a method for verifying an input provided at a controller is disclosed. The method includes detecting a finger gesture provided by a user on a surface of the controller. The finger gesture is used to define the input for an interactive application selected for interaction by the user. Multi-modal data is collected by tracking the finger gesture on the controller using a plurality of sensors and components associated with the controller. An ensemble model is generated using the multi-modal data received from the plurality of sensors and components. The ensemble model is continuously trained using additional multi-modal data collected over time to generate different outputs, wherein the training is in accordance to training rules defined for different finger gestures. The ensemble model is generated and trained to define different outputs using machine learning algorithm. An output from the ensemble model is identified for the finger gesture. The output identified from the ensemble model is interpreted to define the input for the interactive application.

In an alternate implementation, a method for defining an input for an interactive application is disclosed. The method includes receiving a finger gesture provided by a user on a surface of the controller. The finger gesture is used to define the input for the interactive application selected for interaction by the user. Multi-modal data capturing attributes of the finger gesture on the controller is received from a plurality of sensors and components associated with the controller. A weight is assigned to modal data corresponding to each mode included in the multi-modal data captured by the plurality of sensors and components. The weight assigned for each mode is indicative of accurate prediction of the finger gesture using the modal data of each mode. The finger gesture and the multi-modal data is processed based on the weight assigned to each mode to identify the input for the interactive application that corresponds with the finger gesture detected at the controller.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

Figure 1A:
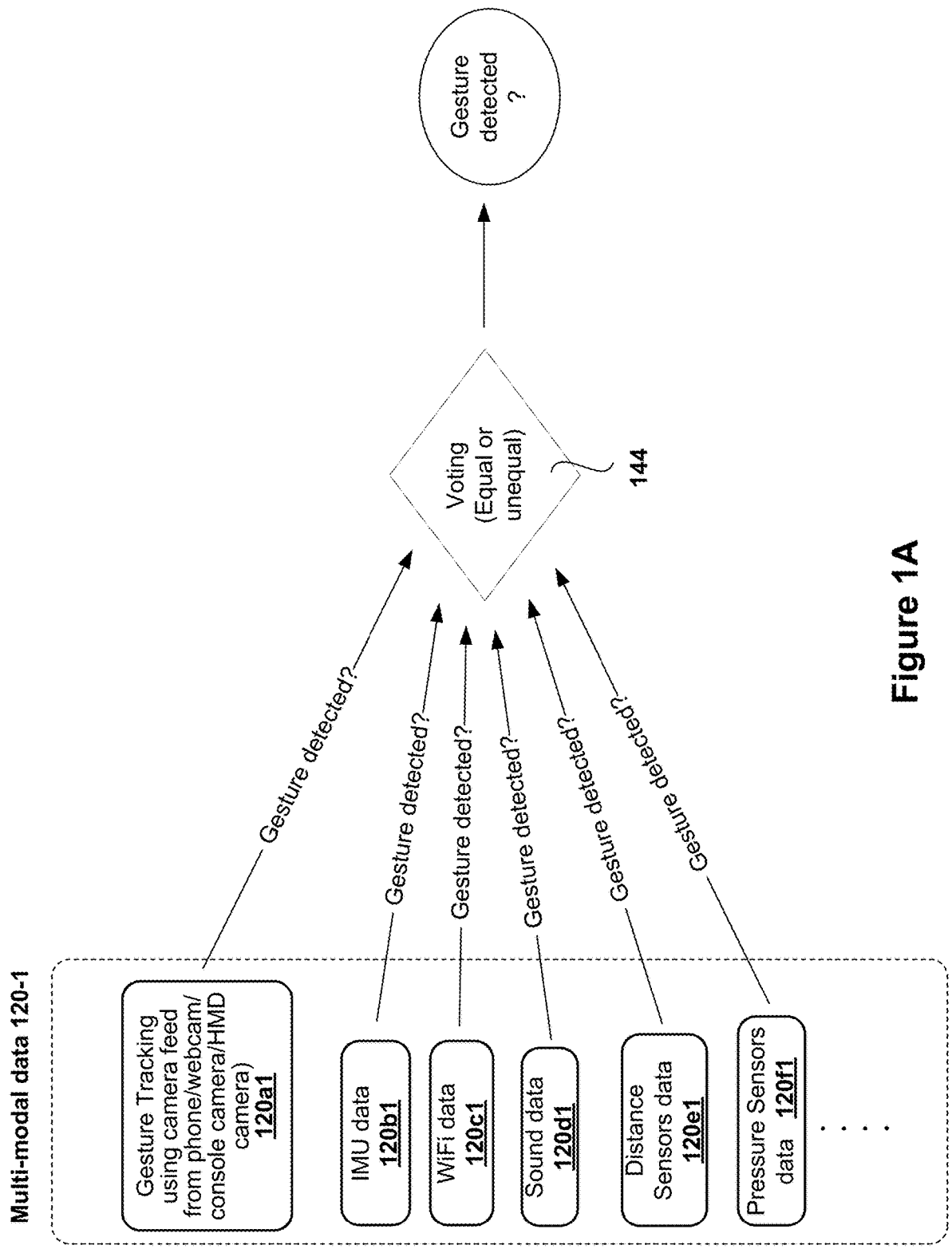
FIG. 1A illustrates an abstract pipeline used for building an ensemble model to detect gestures provided by a user on a controller, in accordance with one implement of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

With the growing number of interactive applications, ways to accurately identify the input provided using various devices becomes especially critical. Specially, in an interactive application, such as a high-intensity video game application, inputs provided using the controller has to be properly detected and accurately interpreted so that the game state of the video game can be correctly updated in a timely manner. To this effect, input provided by a user at an input device, such as a hand-held controller, is detected and, in response, multiple modalities of data tracking the finger gestures at the controller are collected from a plurality of sensors and components associated with the controller. The multi-modal data is used to generate and train a custom finger tracking model, which is then used to identify an output that corresponds with the finger gesture detected at the controller. The trained custom finger tracking model increases the accuracy of predicting the finger gesture better than a generic camera-only finger tracking model, as the finger gesture prediction relies on multiple modal data sources for verifying the finger gesture.

Some of the modal data and the plurality of sensors and components associated with the controller that captured the modal data include, (a) inertial measurement unit (IMU) data captured using IMU sensors, such as magnetometers, gyroscopes, accelerometers, etc., (b) wireless communication signals, including forward signals and reflective signals, captured using wireless communication devices, such as Bluetooth™ enabled devices and Wi-Fi routers disposed in the environment, (c) sound data from a microphone array, (d) sensor data captured using distance and/or proximity sensors, and (e) images data captured using image capturing device(s). The aforementioned modal data and sensors, components are provided as mere examples and should not be considered exhaustive or limiting. The various sensors and components capture the attributes of the finger gesture in various modal forms that is used to generate an ensemble model. To improve accuracy of identifying the finger gesture detected at the controller, training rules defined for the various finger gestures are applied when training the ensemble model. In some implementations, a multi-modal data collection engine executing on a server is engaged to collect the various modal data captured by the plurality of sensors and components at the controller and generate and train the ensemble model. In alternate implementations, the multi-modal data collection engine can be allowed to execute at the controller itself or at a processor that is co-located and coupled to the controller in order to reduce latency.

Each modal data captures some attributes of the finger gesture provided at the controller and these attributes are used to verify the finger gesture so that the correct input corresponding to the finger gesture can be identified for affecting an outcome of an interactive application selected by the user for interaction. The multiple modalities of data captured by tracking the finger gesture on the controller are used to provide additional verification in order to correctly determine the finger gesture so that the correct input can be identified for the interactive application.

FIG. 1A illustrates an example abstract pipeline followed for building an ensemble model to detect a finger gesture, in accordance with some implementations. The abstract pipeline uses multimodal finger tracking approach, wherein the finger gesture is tracked using a plurality of sensors and components associated with a controller and using the data generated from such tracking to identify and/or verify the finger gesture on the controller. Each of the plurality of sensors and components capture modal data of a specific mode. For example, the multiple modal data 120-1 captured by the sensors and components from finger tracking include camera feed 120a1, inertial measure unit sensors (IMUs) data 120b1, WiFi data (including WiFi forward signals and reflective signals) 120c1, sound data 120d1, sensor data from distance/proximity sensors 120e1, sensor data from pressure sensors 120f1, to name a few. Of course, the aforementioned list of data capturing the finger gesture is provided as an example and should not be considered exhaustive or limiting and that other forms of modal data captured from different sensors and components can also be considered in identifying and/or verifying the finger gesture. Modal data from each mode is analyzed to detect finger gesture. Considering modal data from a single mode can lead to errors or less than reliable prediction of the finger gesture. Thus, in order to increase accuracy of finger gesture detection, the modal data from multiple modes are considered in the analysis. In some implementations, the modal data associated with different modes undergo voting using a voting module, wherein the modal data of each mode is assigned a weight. The weight assigned to modal data of each mode can be equal or can be unequal and the decision to assign equal or unequal weight (144) to modal data of each mode, in some implementations, is made based on the reliability of each mode in correctly predicting the finger gesture. The assigned weights for the different modes of data are then used in the analysis to correctly predict the finger gesture. Upon correctly predicting the finger gesture, input related to the finger gesture is identified and used as interactive input from the user to an interactive application selected by the user for interaction. Details of the analysis will be described with reference to FIG. 1B.

Figure 1B:
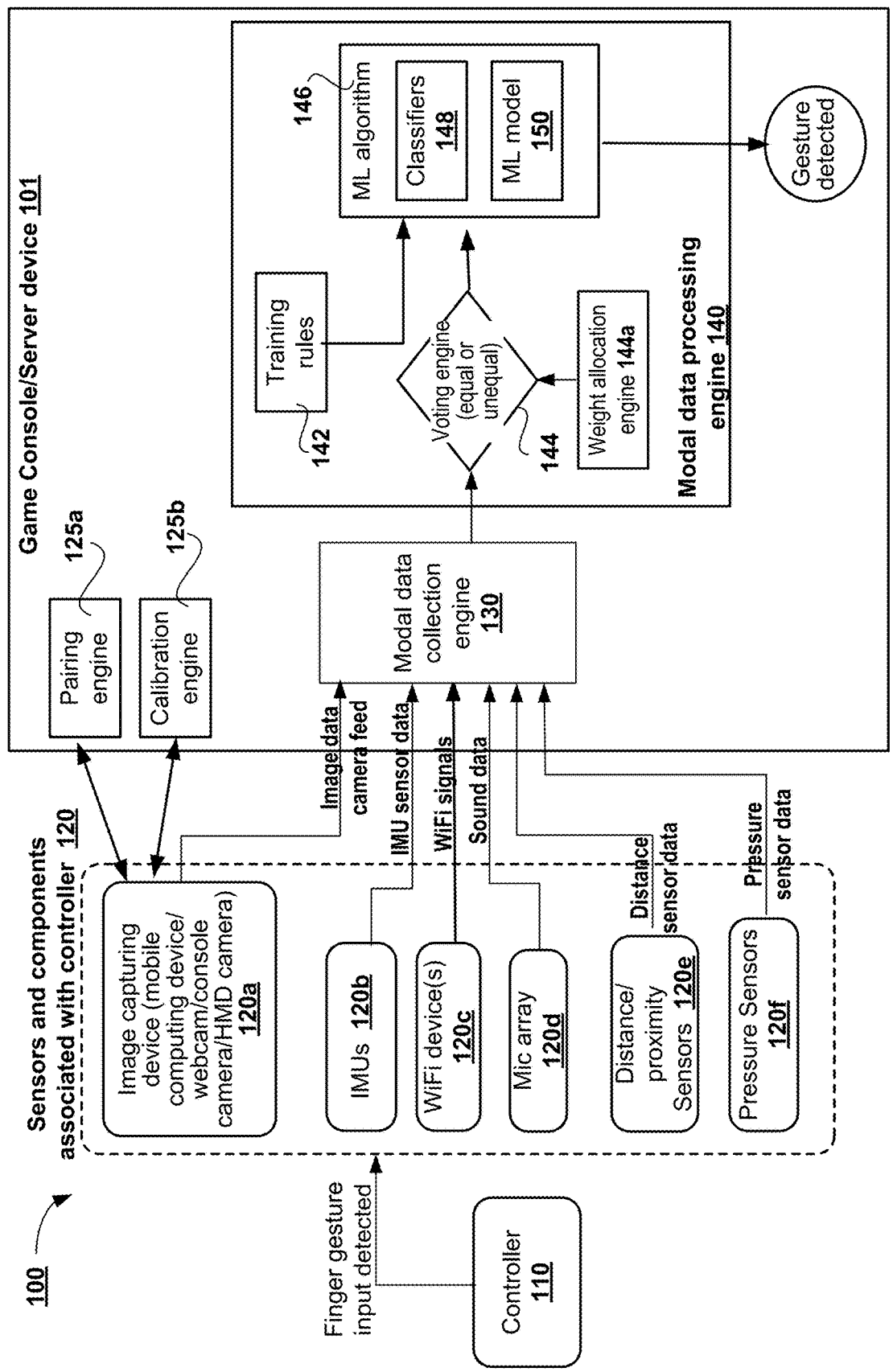
FIG. 1B illustrates a simplified block diagram of various components used to define an abstract pipeline for building an ensemble model to detect input provided via a finger gesture at the controller, in accordance with one implementation of the present disclosure.

FIG. 1B shows the various components of a system 100 for correctly detecting the finger gesture at the controller, so that an input to an interactive application can be properly identified. The various components and sensors used for building an ensemble model represent an abstract pipeline that can be engaged for correctly detecting the finger gesture. The ensemble model is generated and trained using modal data from several modal components and sensors that capture different attributes of the finger gestures provided at the controller. As noted above, the different modalities of data captured by tracking the finger gestures include image feed, IMU data, WiFi signals (Wireless signals including reflective signals), data obtained from distance/proximity sensors, pressure sensors, etc. The attribute information related to the finger gestures captured by each of these components and sensors are forwarded to a server computing device for further processing. The server computing device processes the multi-modal data to properly identify the finger gesture at the controller.

Toward this end, the system 100 for determining an input for an interactive application includes a controller 110, such as a hand-held controller, used by a user to provide finger gestures, a plurality of sensors and components 120 associated with the controller 110 for capturing various attributes of the finger gestures, and a server device 101 that is used for processing the finger gestures and the multi-modal data capturing the various attributes of the finger gestures and for verifying the finger gestures. The finger gestures are provided by the user as input for an interactive application selected for interaction by the user. The server computing device (or simply referred to henceforth as a "server") 101 engages a modal data collection engine 130 to collect the various modalities of data forwarded by the plurality of sensors and components 120 and a modal data processing engine 140 to process the multi-modal data to identify the finger gesture and to define an input for the interactive application. The modal data collection engine 130 and the modal data processing engine 140 may be part of a multi-modal processing engine executing on the server 101.

In some implementations, the server 101 can be a game console or any other computing device that is co-located in the environment in which the user operates. The game console or the computing device may, in turn, be coupled to other game consoles over a network as part of a multi-player setup of a video game. In some implementations, the controller 110 is a networked device, wherein the controller 110 is coupled directly to a remote server 101 over a network (not shown), such as the Internet. In the case of the networked device, the controller 110 is coupled to the network via a router embedded within or external to the controller 110. In other implementations, the controller 110 is coupled to the remote server 101 via a game console or another client device (not shown) over the Internet, wherein the game console or the client device is co-located with the controller 110. The controller 110 is paired to the server 101 as part of an initial set-up, or upon detecting the presence of the controller 110 in the vicinity of the game console, another client device or the router (in the case where the server 101 is connected to the controller 110 via the game console, the router, or the other computing device that is co-located with the controller 110), or upon detecting activation of the controller 110 by the user (i.e., in the case where the server 101 is remotely located from the controller 110). Details of the finger gesture provided on the surface of the controller 110 are forwarded to the game console/server 101 for processing.

In response to detecting the finger gesture provided by the user on the surface of the controller 110, the various sensors and components 120 associated with the controller 110 are automatically activated to capture different attributes of the user's finger gesture. Some of the sensors and components 120 that are automatically activated for collecting the various attributes of the finger gestures include image capturing device(s) 120a, IMUs 120b, WiFi device(s) 120c, Microphone array 120d, distance/proximity sensors 120e and pressure sensors 120f. In addition to the aforementioned sensors and components, other sensors and/or components can also be used to collect attributes of the finger gesture at the controller.

In some implementations, the image capturing device 120a is a camera that is embedded within a mobile computing device, such as a mobile phone or a tablet computing device, etc. Alternatively, the camera can be a webcam, or a console camera or a camera that is part of an HMD. The camera or the device in which the camera is embedded is paired with the game console/server 101 using a pairing engine 125a. The pairing allows the image capturing device (i.e., camera) to receive, from the game console/server 101, an activation signal for capturing images of the finger gesture of the user on the controller 110. The game console/server 101 generates the activation signal to the image capturing device upon detecting the finger gesture on a surface of the controller 110. The mobile computing device with the embedded camera is supported on a holding structure disposed on the controller 110 to allow the camera in the mobile computing device to capture a close-up view of the various features of the finger gesture provided on the controller 110. More information on the holding structure will be discussed with reference to FIGS. 5A and 5B. Once activated, the image capturing device captures the images of various attributes of the finger gesture, including the finger used to provide the gesture, position of the fingers with respect to input controls (e.g., buttons, touch-screen surface, other interactive surfaces, etc.) on the controller 110, movement of the finger on the controller, type of finger gesture provided (e.g., single tap, double tap, slide gesture, etc.), etc. The images capturing the attributes of the finger gesture are forwarded to the modal data collection engine 130 executing on the game console/server 101 as image data camera feed.

In response to activation of the various sensors and components, the inertial measurement unit (IMU) sensors 120b integrated within the controller 110 are used to capture the IMU signals pertaining to the finger gesture. The IMU signals captured by the IMU sensors while the user is holding the controller 110 in their hands, in some implementations, are used to differentiate the different finger gestures detected at the controller 110. For example, an IMU signal capturing a subtle tapping at a location defined in a back surface of the controller 110 can be interpreted to mean a first input (i.e., a virtual button 1), an IMU signal capturing a subtle tapping at a location defined in a front surface of the controller 110 that does not include any buttons or interactive interfaces can be interpreted to mean a second input (i.e., a virtual button 2), an IMU signal capturing a tapping at a back-top-right corner of the controller 110 can be interpreted to mean a third input (i.e., a virtual button 3), a tapping at a back-top-left corner of the controller 110 can be interpreted to mean a fourth input (i.e., a virtual button 4), an IMU signal capturing a tapping at the back of the controller using a middle finger can be interpreted to mean a fifth input (i.e., a virtual button 5), a tapping on a real button on the front of the controller 110 can be interpreted to mean a sixth input (e.g., a real-button press), etc.

In some implementations, virtual buttons defined by tracking finger gestures can be used to extend the functionality of the controller 110. The extended functionality allows the user to interact with more than one application simultaneously and such interactions can be done without having to interrupt one application for another. The virtual buttons can be defined by identifying finger positions as the user is holding the controller 110, and the finger gesture provided by the user in relation to the identified finger positions. Sometimes, when a user is playing a game, for example, executing on a game controller or a game server, the user may also be listening to music provided through a second application (e.g., music application). Normally, when the user has to interact with the music application, the user has to pause the game that they are currently playing, access a menu to interact with the music application, use one of the buttons or the interactive surface on the controller 110 to advance to a next song on their play list. To avoid the user from pausing the game play of the game and to provide other ways to interact with the music application simultaneously while playing the game, virtual buttons can be defined to extend the capability of the controller 110. The virtual buttons can be defined and associated with pre-assigned commands so that the user can use the virtual buttons to interact with the music application without having to interrupt the current game play of the user.

In another implementation, the finger gesture tracking while the user is holding the controller can be used to allow users with certain disabilities to communicate in an online game. For example, the finger gesture tracking could be used to detect the different fingers positions and gestures while the user with a disability is holding the controller 110. These fingers positions and gestures can be interpreted, using machine learning (ML) algorithm, as Morse code inputs (dots and dashes for the taps and swipes) and such interpretation can be done by the ML algorithm by recognizing the disability of the user as provided in a user profile of the user. Further, the Morse code inputs can be translated into text characters or provided as game inputs. The text characters can be used to vocally communicate with other players/spectators/users by converting text-to-speech or provided as a textual response on a chat interface. The Morse code inputs can be interpreted to correlate with game inputs and used in affecting game state of the game played by the user. The aforementioned applications of using finger gesture tracking and interpreting to identify virtual buttons and/or inputs to an interactive application for a user with disabilities are provided as examples and should not be considered exhaustive or limiting and that other applications can also be envisioned.

Figures 2A, 2B:
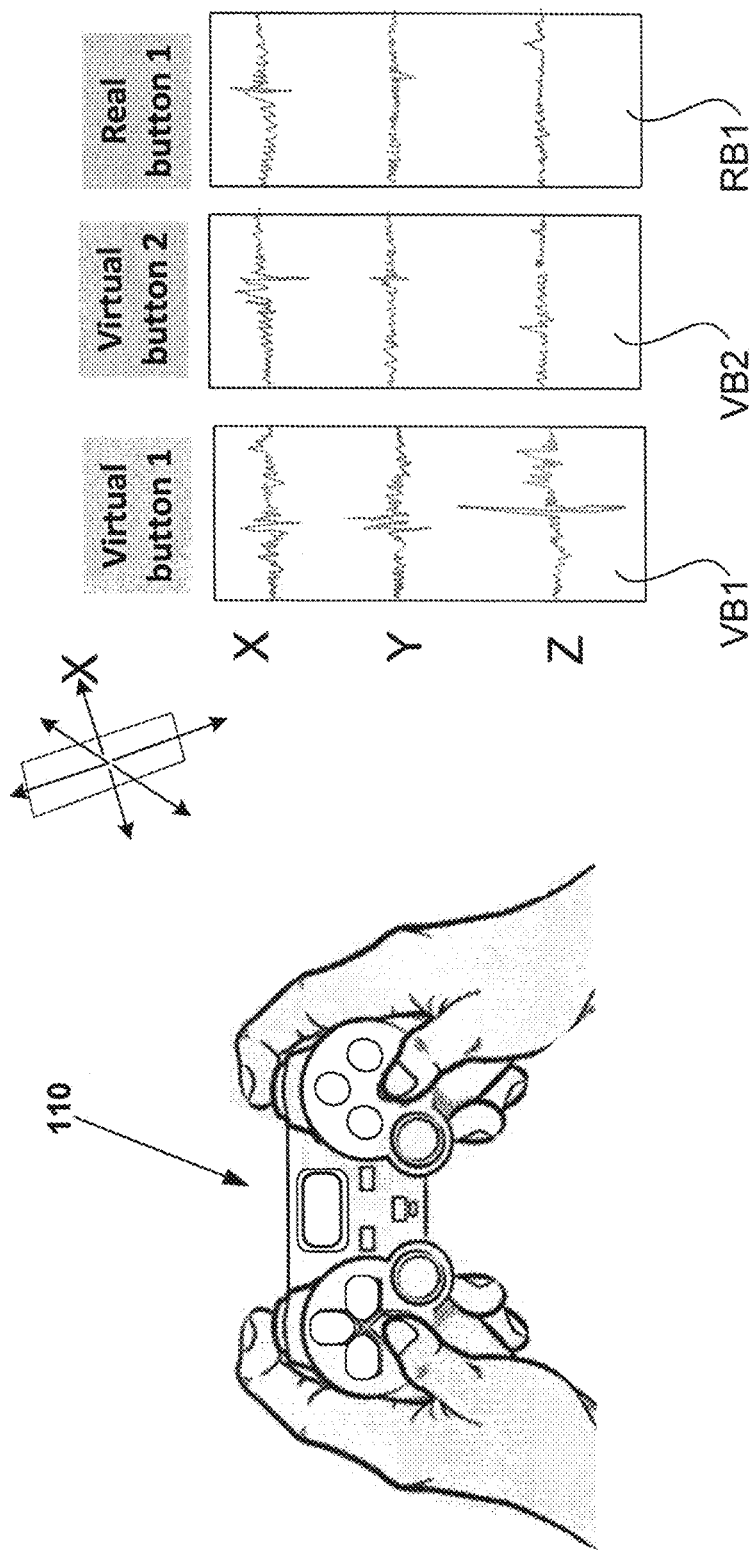
FIGS. 2A and 2B illustrate an example of determining the real button press and virtual button presses at the controller using modal data collected from inertial measure unit sensors associated with the controller responsive to finger gesture detected at the controller, in accordance with one implementation of the present disclosure.

FIGS. 2A and 2B illustrate some example signal amplitude variations captured in the respective IMU signals for the different finger gestures using the IMU sensors 120b.

FIG. 2A illustrates the position of the fingers of the user in relation to different input controls (i.e., buttons and touch-screen interactive interface) defined on the controller 110 when the user is operating the controller 110. FIG. 2B illustrates some example amplitude variations captured for 3 different finger gesture detected at different location on the controller, in some implementations. The amplitude variations shown in FIG. 2B represent the amplitude variations along the X, Y and Z axes as captured in the IMU signal for the different finger gestures. For instance, the amplitude variation shown along X, Y and Z axes in box 'VB1' relates to finger gesture 1, which can be interpreted to mean that the finger gesture 1 provided by the user at the controller 110 corresponds to input related to virtual button 1. Similarly, the amplitude variation shown along X, Y and Z axes in box 'VB2' relates to finger gesture 2, which can be interpreted to mean that the finger gesture 2 provided by the user at the controller 110 corresponds to input related to virtual button 2, and the amplitude variation shown along X, Y and Z axes in box 'RB1' corresponds to finger gesture 3, which can be interpreted to mean that the finger gesture 3 provided by the user at the controller 110 corresponds to input related to real button 1. Of course, the virtual buttons 1, 2, 3, etc., and real buttons 1, 2, 3, etc., can be defined to relate to different inputs for different interactive applications. The IMU signals capturing the subtle signals are forwarded as IMU sensor data to the modal data collection engine 130.

Referring back to FIG. 1B, in response to activation of the various sensors and components, the WiFi devices (i.e., wireless devices) 120c distributed in an environment where the user is located begin to capture the WiFi signals. The data captured in the WiFi signals are used to detect location of the user, relative location of the various body parts of the user including hands and fingers, body movements including finger movements/finger gestures, etc. The data from the WiFi signals and the reflected signals of the WiFi signals can be used to detect different finger movements while the user is holding the game controller 110.

Figure 3A:
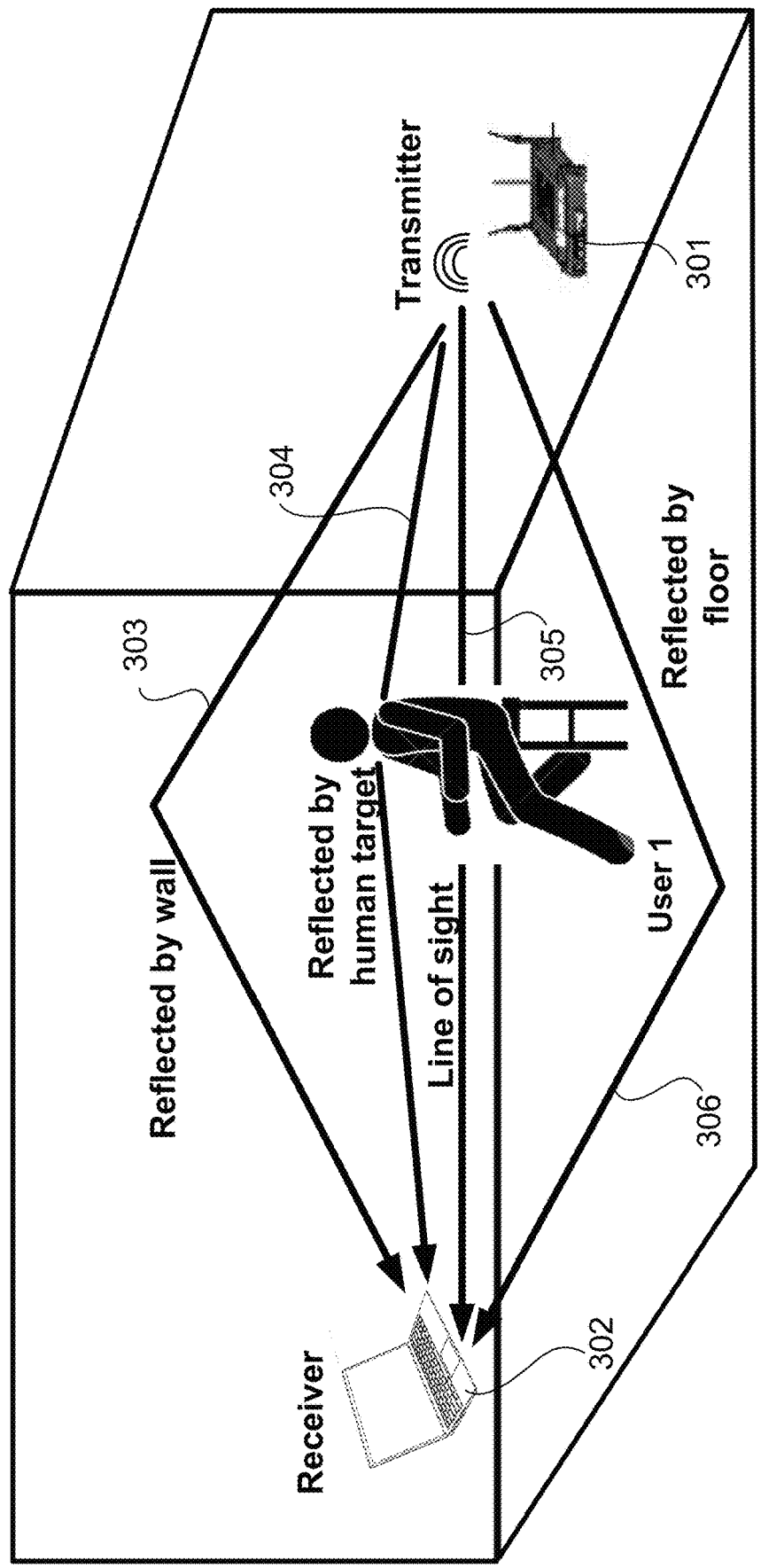
FIG. 3A illustrates example wireless signals and reflective signals captured using wireless communication devices to detect different finger movements of a user holding a controller, in accordance with one implementation of the present disclosure.
Figure 3B:
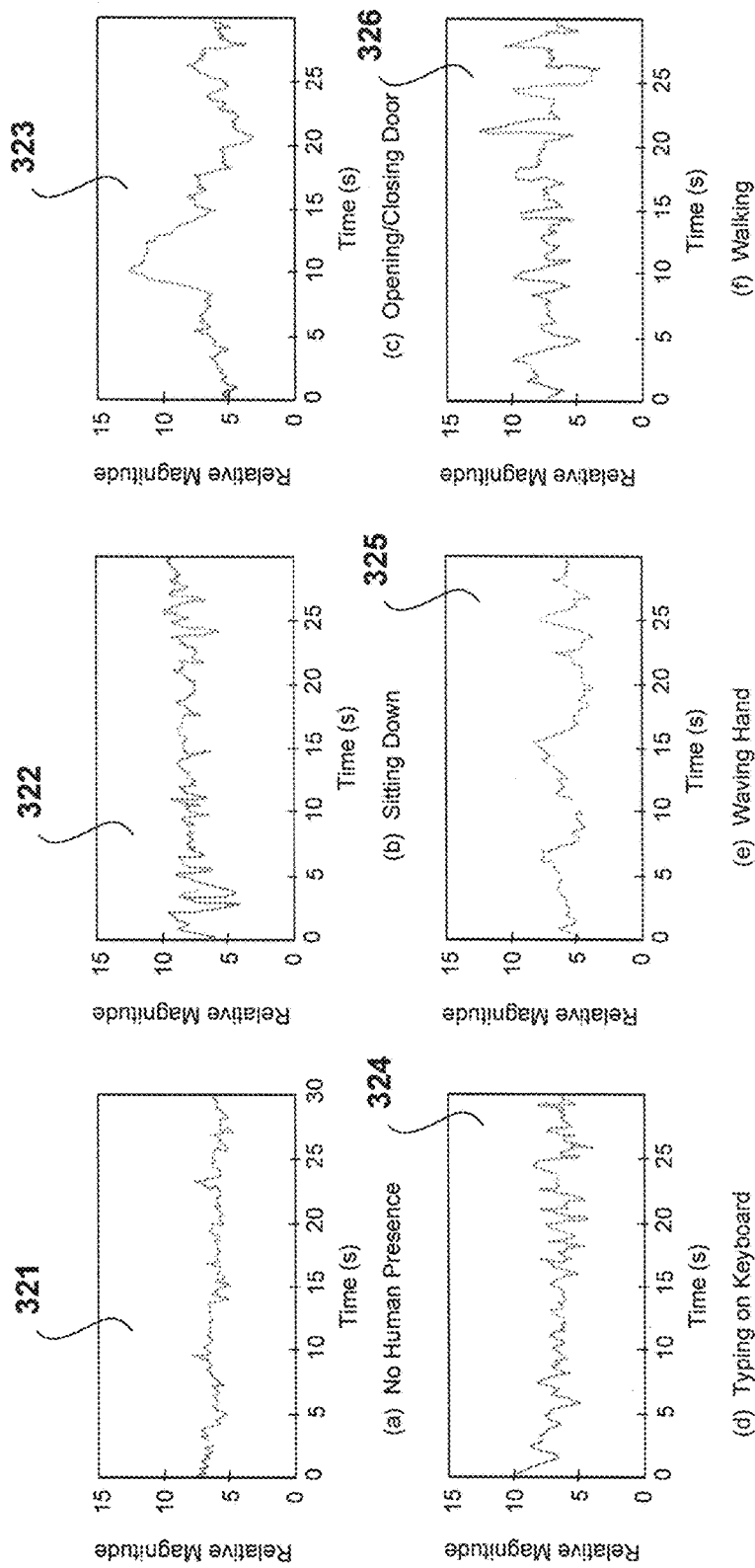
FIG. 3B illustrates some example wireless signal graphs capturing amplitude variations caused by tracking some user movements, in accordance with some implementations of the present disclosure.

FIGS. 3A and 3B illustrate the various WiFi signals captured in the environment (i.e., geo location) where the user (i.e., user1) is located using the WiFi devices. The WiFi devices include a transmitter 301, such as a router, laptops, other computing devices including personal digital assistants (e.g., voice assistants), and a receiver device 302, such as a second laptop or a desktop computing device, etc. The aforementioned list of devices representing the transmitter 301 and the receiver 302 are provided as mere examples and should not be considered exhaustive or limiting. The transmitter 301 continuously transmits WiFi signals and the receiver 302 receives the various WiFi signals. FIG. 3A shows the various WiFi signals transmitted by the transmitter 301 in a room where the user is located and the WiFi signals received by the receiver 302. Some of the WiFi signals received by the receiver 302 include WiFi signal 303 reflected by the wall of the room, WiFi signal 304 reflected by the user 1, WiFi signal 305 that represents the line of sight of user 1, and the WiFi signal 306 reflected by the floor of the room. The WiFi signals received by the receiver 302 are continuously monitored to determine movement of the user within the geo location of the room. Initially, channel state information (CSI) representing channel properties of a communication link between the transmitter 301 and the receiver 302 is first determined for a geo location where user 1 is to operate, using the WiFi signals transmitted by the transmitter 301 and received by the receiver 302 when no object or user is present between the transmitter 301 and the receiver 302. The channel properties is used to establish a baseline for the WiFi signals and take into account the combined effect of scattering, fading, and signal strength decay with distance. The CSI is then determined when user 1 is present in the geo location (e.g., room) and when user 1 moves within the room. The variation in the CSI is due to the body of the user blocking or reflecting one or more of the aforementioned WiFi signals. This variation in the respective one or more WiFi signals collected over a period of time is used to determine the user's movement in the geo location (e.g., room), including different finger movements of user 1 while user 1 is holding and operating the game controller 110. The channel properties of the WiFi signals can be used to capture snapshots of body parts, including fingers of user 1. These snapshots can then be used to reconstruct the body part to determine which body part (e.g., finger) was moved. The WiFi signals can include signals provided by routers and Bluetooth™ signals provided by the controller.

FIG. 3B illustrates the CSI signal amplitude variations of Wifi signals received from a WiFi device (e.g., a single sub-carrier) caused by user movements, in some implementations. The signal amplitude variations are plotted against time. The signal amplitude variation 321 is shown for WiFi signals transmitted when no user or objects are present between the transmitter 301 and the receiver 302 in the geo location. In some implementation, the signal amplitude variation 321 establishes the baseline CSI signal amplitude variation. Signal amplitude variations 322-326 capture the variations caused by user movement. For example, signal amplitude variation 322 shows an example of variation in WiFi signals upon detecting user 1 sitting down in the room (i.e., geo location), signal amplitude variation 323 captures the variation in the WiFi signals upon detecting opening or closing of door of the room, signal amplitude variation 324 captures the variation in the WiFi signals upon detecting user 1 typing on an input device, such as a keyboard, signal amplitude variation 325 captures the variation in WiFi signals upon detecting user 1 waving their hand, and signal amplitude variation 326 captures the variation in WiFi signals upon detecting user 1 walking in the room. Thus, using the WiFi signals, it is possible to detect the different finger movements when the user is operating the controller 110. The WiFi signals capturing the various user movements are forwarded to the modal data collection engine 130 as WiFi signals.

Referring back to FIG. 1B, in response to detecting the finger gesture on the controller 110, a microphone array 120d embedded or attached to the controller 110 is activated. The finger gesture may be a real-button press at the controller 110 or a virtual button press and the activated microphone array 120 is configured to capture attributes of sound of the button press. Specifically, the microphones within the microphone array 120d work together to determine the direction from where the sound originates and pinpoint the location. The attributes of the finger gesture (i.e., direction and location) are used to determine whether the finger gesture corresponds to a real-button press or a virtual button press. In some implementations, different locations of the controller other than the locations where real-buttons and touch-screen interface are disposed can represent different virtual buttons. For example, a left-hand corner in the back of the controller 110 may be defined to represent virtual button 1, a right-hand corner in the back of the controller 110 may be defined to represent virtual button 2, a top central location on the back of the controller 110 may be defined to represent virtual button 3, etc. The attributes of the sound caused by the finger gesture can be interpreted to determine whether the finger gesture corresponds with a real-button press or a virtual-button press and to determine which real-button or virtual-button was pressed. The attributes of the sound captured by the microphone array 120d are forwarded to the modal data collection engine 130.

Figure 4:
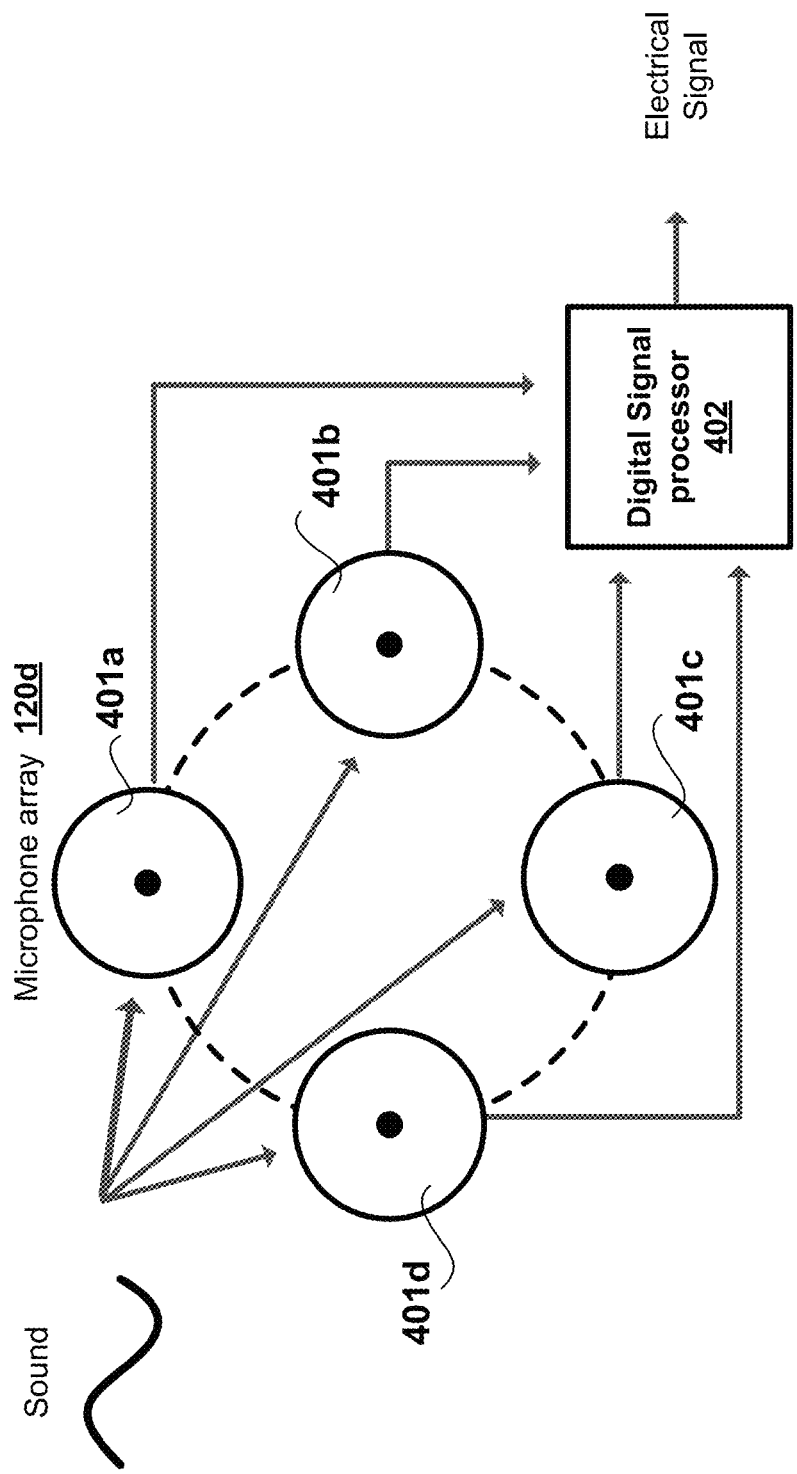
FIG. 4 illustrates an example microphone array used to capture sound of activating controls (e.g., button presses) on a controller to predict virtual button being pressed, in accordance with one implementation of the present disclosure.

FIG. 4 illustrates an example microphone array 120d that is embedded within or coupled to the controller 110 to capture the sound originating from the finger gesture of the user at the surface of the controller 110. The microphone array 120d is shown to include 4 microphones (401a, 401b, 401c and 401d). The intensity of the sound captured by each of the microphones 401 vary based on the distance of the sound from the respective microphones 401. The sound signal captured by each of the microphones 401a-401d is then forwarded to a digital signal processor (DSP) 402 for processing. In some implementations, the DSP 402 is configured to assign distinct weights to different sounds captured by the microphones. The sounds and the relative weight assigned to each of the sounds captured by the different microphones in the microphone array 120d are analyzed using, for example, a triangulation technique to identify the attributes, such as direction, location, lasting time, volume, frequency, etc., of the various sounds captured and to use the attributes along with the relative weights to determine a specific button press, or a swipe and direction of the swipe, etc. In alternate implementations, instead of assigning a distinct weight to each sound, the DSP 402 can assign distinct weights to different attributes of each sound detected/captured by the microphones in the microphone array 120d and use the weights and the detected attributes to relate the sounds to a specific button press or finger swipe. The weight assigned to the different attributes can be used to determine which sound to ignore as an ambient sound/noise and which one to focus on to determine the finger gesture. The attributes of the sound and the details of the analysis are then forwarded to the modal data collection engine 130 as electrical signal.

Referring back to FIG. 1B, in response to detecting the finger gesture on the controller 110, one or more distance/proximity sensors 120e are activated to capture the attributes of the finger gesture provided at the controller 110, in some implementations. Similar to the microphone array, the distance/proximity sensors 120e can be used to capture the attributes of finger gesture provided at the backside of the controller 110. The attributes of the finger gesture provided on the backside of the controller 110 captured by the distance/proximity sensors 120e can be used to independently determine virtual button press or can be used in conjunction with the attributes of the sound captured by the microphone array 120d to further verify virtual button press determined from the finger gesture. The additional verification provided by the data captured by the distance/proximity sensors 120e make the detection of virtual-button press from the finger gesture more accurate. In some implementations, the distance/proximity sensors 120e can include ultrasonic sensors, infrared sensors, LED time of flight sensor, capacitive sensors, etc. The aforementioned list of distance/proximity sensors 120e are provided as examples and should not be considered exhaustive or limiting. The attributes of the finger gesture captured by the distance/proximity sensors 120e are forwarded to the modal data collection engine 130. In addition to the distance/proximity sensors 120e, pressure sensors 120f can also be activated to capture attributes of pressure (e.g., location, amount of pressure, pressure application time, finger used to apply pressure, etc.) applied at different location of the controller 110 by the finger gesture. For example, if the pressure application time is less than a threshold value, the attributes of the pressure captured by the pressure sensor 120*f* can be ignored. If the pressure application time is greater than the threshold value, then the attributes of the pressure applied can be forwarded as input to the modal data collection engine 130. Similarly, if the amount of pressure applied is less than a threshold amount, the data captured by the pressure sensors 120*f* can be ignored. However, if the amount of pressure applied is greater than the threshold amount, the data captured by the pressure sensors 120*f* can be considered as input to the modal data collection engine 130. The attributes of the pressure provided via the finger gesture that meet or exceed the threshold value/amount are forwarded as the pressure sensor data to the modal data collection engine 130.

As noted previously, in some implementations, the image capturing device can be a camera embedded within a mobile computing device, such as a mobile phone or a tablet computing device. In these implementations, the camera of the mobile phone, for example, may be preferred over a webcam or a console camera or a camera embedded within the HMD. In alternate implementations, the camera embedded within the mobile phone (i.e., mobile computing device) can be used in addition to the webcam/console camera/HMD camera to capture the images of the attributes of the finger gestures. In the implementations where the camera of the mobile computing device is used to capture the images of the attributes of the finger gesture, the mobile computing device (e.g., mobile phone) can be coupled to the controller 110.

Figures 5A, 5B:
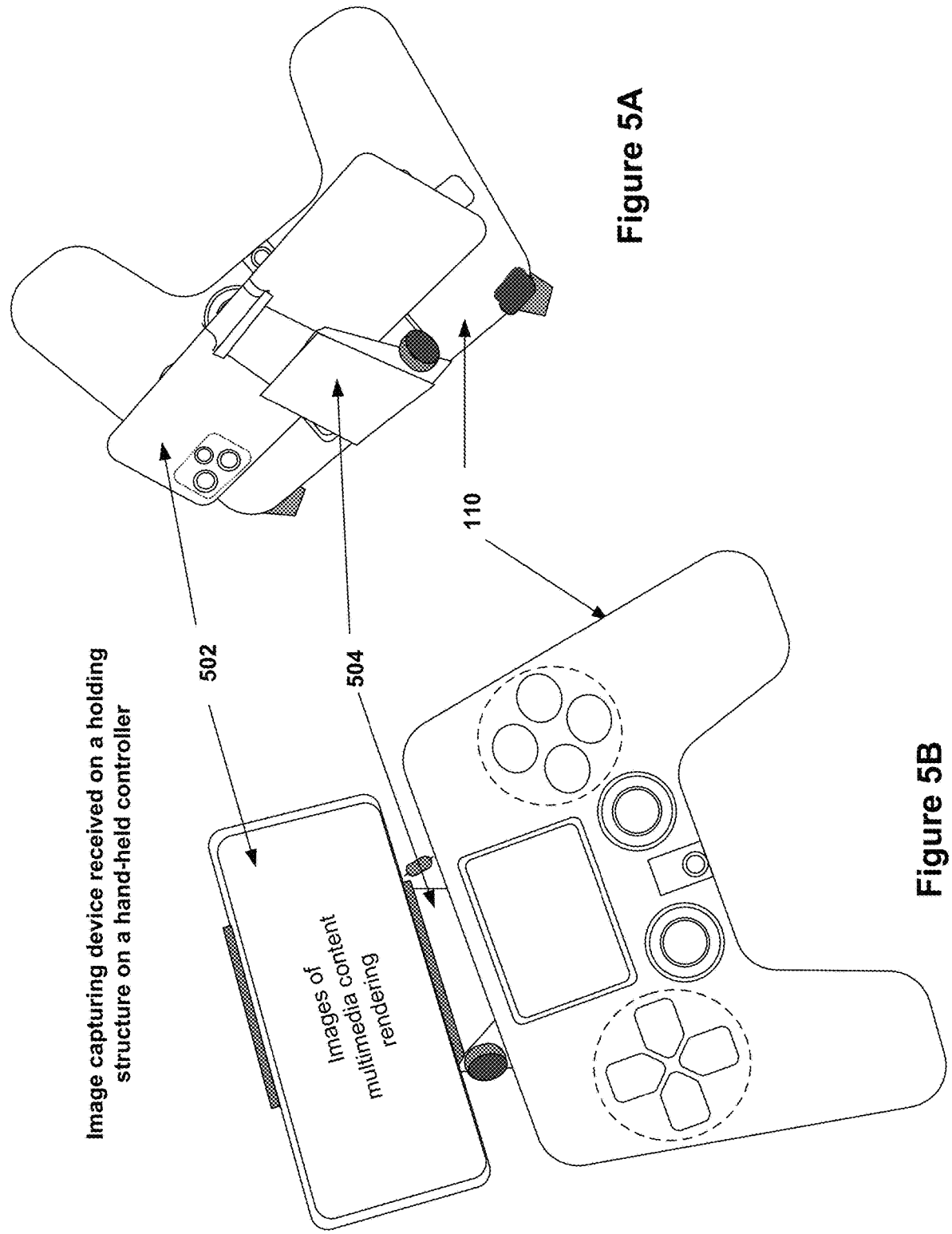
FIGS. 5A and 5B illustrate various views of an image capturing device that is coupled to a wireless controller to capture finger gestures provided at the controller, in accordance with one implementation of the present disclosure.

FIGS. 5A and 5B illustrate one such implementation, wherein the mobile computing device (e.g., mobile phone 502) is coupled to the controller 110. In some implementations, the mobile phone 502 is coupled to the controller 110 using a holding structure 504. FIG. 5A shows a front perspective view of the controller 110 with the holding structure 504 for receiving and holding the mobile phone 502. FIG. 5B shows a backside view of the holding structure 504 coupled to the controller 110 and configured to receive, hold and manipulate the mobile phone 502. In some implementations, the holding structure 504 is a three-dimensional (3D) printed structure that can be attached to the controller 110. In some implementations, the 3D printed structure is equipped with motors (not shown) to move the mobile phone 502 to different positions to allow the camera of the mobile phone 502 to capture the various attributes of finger gesture.

Referring simultaneously to FIGS. 1B, 5A and 5B, in some implementations, in order to accommodate different mobile phone models (size of the mobile phone, location of the camera, number of cameras, etc.), the game console/server 101 first performs an automatic pairing operation to pair the mobile phone 502 to the game console/server 101. A signal is transmitted from the pairing engine 125*a* to the mobile phone to initiate the pairing operation. After successful pairing of the mobile phone 502 to the game console/server 101, the mobile phone 502 is mounted to the holding structure by initiating a calibration operation. A calibration engine 125*b* is used to determine a make and a model of the mobile phone 502 and a signal is transmitted to the holding structure to adjust a size of the holding structure to accommodate the mobile phone 502. Responsive to the signal from the calibration engine 125*b*, the motors operating the holding structure 504 adjust the size of the holding structure 504 so that the mobile phone 502 can be securely received. In addition to automatically calibrating the size of the holding structure to accommodate the mobile phone 502, the calibration engine 125*b* calibrates the angle to which the mobile phone needs to be adjusted in order to capture the images of different positions of the fingers. The angle is calibrated automatically in response to detecting the presence of the fingers of the user and the finger gesture provided on the controller 110 and is dynamically determined based on the location of the fingers of the user as the user is providing the finger gesture at the controller 110. As part of the angle calibration operation, the calibration engine 125*b* tracks the hands and fingers of the user and transmits a second signal to the controller 110 and/or the holding structure 504 to adjust the motors so as to move the mobile phone 502 such that the camera(s) of the mobile phone 502 align with the calibrated angle. Responsive to the second signal from the calibration engine 125*b*, the motors of the holding structure 504 are engaged to move and rotate movable parts of the holding structure 504 to achieve a good hand and finger tracking position. Once the mobile phone is moved into position, the camera(s) of the mobile phone 502 is/are activated to capture the images of various attributes of the finger gesture. The captured images are streamed to the game console/server 101 as image data camera feed.

The inputs from the plurality of sensors and the components 120 are collected by the modal data collection engine 130 to generate multi-modal data. The multi-modal data is processed to identify a mode and the amount of modal data captured for each mode included in the multi-modal data collected from the sensors and components. The details of the mode, the amount of modal data of each mode and the multi-modal data captured by the sensors and the components 120 are forwarded by the modal data collection engine 130 to the modal data processing engine 140 for further processing.

The modal data processing engine 140 analyzes modal data of each mode included in the multi-modal data to identify and/or verify the finger gesture at the controller. As previously noted with reference to FIG. 1A, in order to increase accuracy of finger gesture detection, the modal data from multiple modes are considered in the analysis. As part of the analysis, the modal data associated with each mode is assigned a weight. The weight assigned to modal data of each mode can be equal or unequal. A decision to assign equal or unequal weight (144) to modal data of each mode is made, in some implementations, based on the accuracy of correctly predicting the finger gesture using modal data of each mode. In some implementations, the multi-modal data can be broadly classified into a first set of modal data captured using the plurality of sensors, and a second set of modal data captured using the components. In some implementations, the weight assigned to modal data for each mode captured by the sensors is greater than the weight assigned to modal data for each mode captured by the components. For instance, the IMU sensor data captured by the IMU sensors or distance sensor data captured by the distance/proximity sensors are assigned greater weight than the image data camera feed captured by image capturing devices. In another instance, IMU sensor data and sound data are assigned greater weight than WiFi signal data. A weight allocation engine 144*a* is used to identify the mode associated with each modal data included in the multi-modal data and reliability of the modal data of the respective mode in predicting the finger gesture. Based on the reliability of each mode, the weight allocation engine 144*a* assigns a weight to the modal data. The assigned weights for the different modes of data are used together to correctly predict the finger gesture. For example, the assigned weight for the modal data of each mode included in the multi-modal data is used by the modal data processing engine 140 to generate a cumulative weight. The cumulative weight is used to correctly predict the finger gesture. The predicted finger gesture is more accurate as the game console/server 101 relies on more than one mode of data to identify and/or verify the finger gesture. Once the finger gesture is identified/verified, the input related to the finger gesture is then identified and used as user input to an interactive application, such as video game, to affect a game state.

In some implementations, the modal data processing engine 140 engages machine learning (ML) algorithm 146 to analyze the multi-modal data captured by the plurality of sensors and components to identify and/or verify the finger gesture provided at the controller 110. The ML algorithm 146 generates and trains a ML model 150 using the multi-modal data. The ML model 150 is used to predict and/or verify the finger gesture so that an appropriate input corresponding to the predicted/verified finger gesture can be identified and used to affect a state of an interactive application (e.g., a video game) selected by the user for interaction. The ML algorithm 146 engages classifier engines (i.e., classifiers) 148 to generate and train the ML model 150. The ML model 150 includes a network of interconnected nodes, wherein each consecutive pair of nodes is connected by an edge. The classifiers 148 are used to populate various nodes within the network of interconnected nodes of the ML model 150, wherein each node relates to modal data of one or more modes. The inter-relationships between the nodes are established to understand the intricacies of the modal data of the different modes and to identify an output that is used to identify or verify the finger gesture and to identify an input that corresponds with the finger gesture.

In some implementations, the classifiers 148 are pre-defined for different modes to understand the intricacies of the modal data of each mode in correctly predicting and/or verifying the finger gesture provided at the controller. The classifiers 148 use the modal data captured in real-time by the sensors and components, as and when a finger gesture is provided at the controller 110 to further train the ML model 150, and use the ML model 150 to determine the amount of influence the modal data of each mode has in the correct prediction/verification of the finger gesture. The ML model 150 can be trained in accordance to training rules 142 in order to improve accuracy of finger gesture prediction. The training rules are defined for each finger gesture based on the finger anatomy, ways of holding the controller, finger positions in relation to buttons, etc. The machine learning (ML) algorithm 146 uses the modal data for the different modes included in the multi-modal data as inputs to the nodes of the ML model 150, progressively updates the nodes using additional multi-modal data received over time, and adjusts the outputs to meet a pre-defined criteria for the different the finger gestures. The ML algorithm 146 uses reinforced learning to strengthen the ML model 150 by using the initial set of multi-modal data to build the ML model 150, learn the intricacies of each mode and how the modal data of each mode influences in the correct prediction/verification of the finger gesture, and reinforce the learning and strengthening of the model using the additional modal data received over time. The adjusted outputs of the ML model 150 are used to correctly predict/verify the different finger gestures. An output from the adjusted outputs is selected to correspond with the finger gesture and such selection may be based on the cumulative weight of the multi-modal data, which is indicative of the accurate prediction of the finger gesture.

In some implementations, the finger gesture tracking using modal data captured for different modes, may be specific for a user. For example, each user may handle the controller 110 in a different manner. For instance, a first user may hold the controller 110 in a specific manner, provide the inputs on the controller in a specific manner or at specific speed or specific pressure, etc. When a second user uses the controller 110 to provide inputs via finger gestures, their way of holding or providing inputs using the controller 110 can be different from the first user. In order to take into consideration different users' way of handling the controller 110, a reset switch may be provided at the controller 110 to allow the finger gesture tracking to be reset or re-programmed so that finger gesture interpretation can be user specific and not user agnostic. The reset switch can be defined to be a specific button press or specific sequence of button presses. In another instance, the reset or re-programming of the finger gesture tracking can be done on demand from the user, wherein such request may be based on the specific context for which the finger gesture is to be tracked, for example.

Although various implementations discussed herein describe the modal data collection engine 130 and the modal data processing engine 140 with the ML algorithm 146 to identify/verify the finger gesture as being implemented on the server 101, the modal data collection engine 130, modal data processing engine 140 with the ML algorithm 146 can be implemented locally on disks within a computing device (e.g., game console that is co-located with the controller) coupled to the controller 110 instead of on a remote server 101, in order to reduce latency. In such implementations, graphical processing units (GPUs) on the game console can be used to improve the speed of predicting the finger gestures.

The various implementations discussed herein teach a multimodal finger tracking mechanism in which several modal components capture multi-modal data. Each of the modal components provide information pertaining to detection of finger gesture to a voting engine. The voting engine in-turn assigns appropriate weight to modal data of each mode that is indicative of accurate prediction of the finger gesture using the modal data of the respective mode. For example, greater weight can be given to modal data generated from sensors as the sensors tend to detect gestures more accurately than a webcam feed. The relative weights to modal data based on prediction accuracy results in reduced errors in detecting the finger gestures as the system relies on modal data of more than one mode. The modal data processing engine 140 trains the custom finger tracking model (i.e., ML model 150) using real-button press state data, video features (i.e., images from image capturing devices), audio features using the microphone array associated with the controller 110, sensor data, WiFi signals, to predict the finger gesture with higher accuracy than if the prediction relied on just a single source of data, such as generic camera only finger tracking model.

Figure 6:
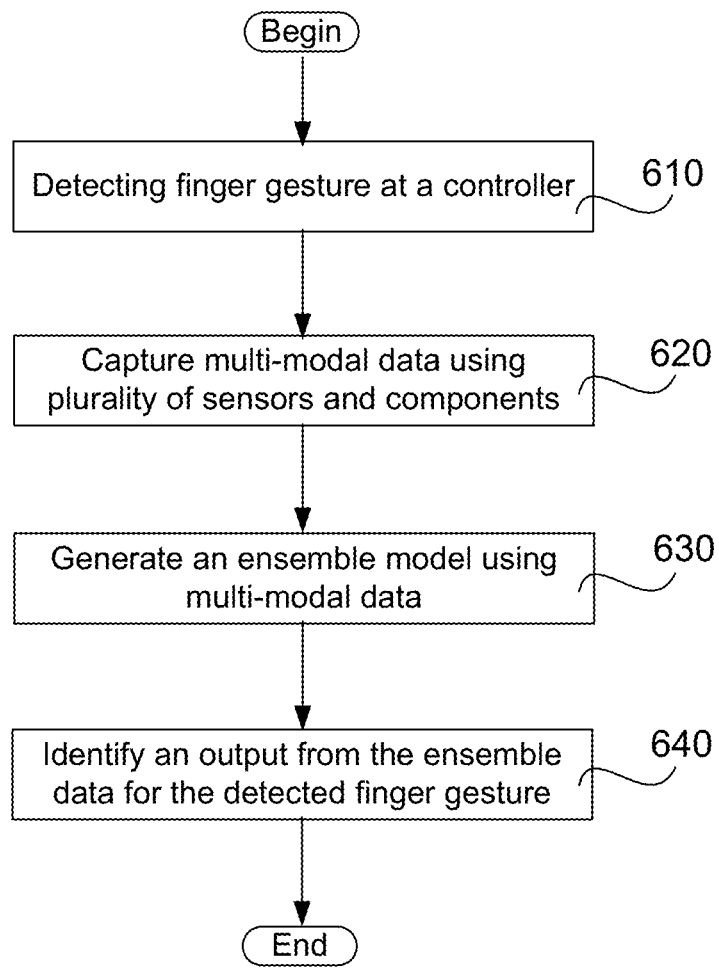
FIG. 6 illustrates a simplified flow of operations of a method for verifying an input provided at a controller for an interactive application, in accordance with one implementation of the present disclosure.

FIG. 6 illustrates a flow of operations of a method for verifying an input provided at a controller, in some implementations. The method begins at operation 610 when a finger gesture is detected on a surface of a controller operated by a user for interacting with an interactive application, such as a video game. The finger gesture may be provided at any surface of the controller including at the input controls, such as real-buttons and touch-screen interactive interface. Responsive to the detection of the finger gesture a plurality of sensors and components are activated to capture the various attributes of the finger gesture, as illustrated in operation 620. Each sensor or component captures the modal data for a specific mode and the modal data captured by the plurality of sensors and components are collected to define multi-modal data. An ensemble model is generated using machine learning algorithm, as illustrated in operation 630. The ensemble model is generated to include a network of interconnected nodes, wherein each node is populated using modal data of one or more modes. Knowledge generated at each node based on the modal data included therein is exchanged between the different nodes within the network through the interconnections and this knowledge is propagated to other nodes thereby building on the knowledge. To improve the accuracy of predicting/verifying finger gesture, modal data of each mode may be accorded a weight that is indicative of accurate prediction of the finger gesture using the modal data of the respective mode. Outputs are defined in the ensemble model (also referred to herein as "ML model 150") based on the cumulative weight of the various modal data collected for the finger gesture, wherein each output meets a certain level of prediction criteria for predicting the finger gesture. An output from the ensemble model is identified for the finger gesture, as illustrated in operation 640. The output is identified to at least meet the prediction criteria defined or required for the finger gesture. The identified output from the ensemble model is used to define an input related to the finger gesture.

Figure 7:
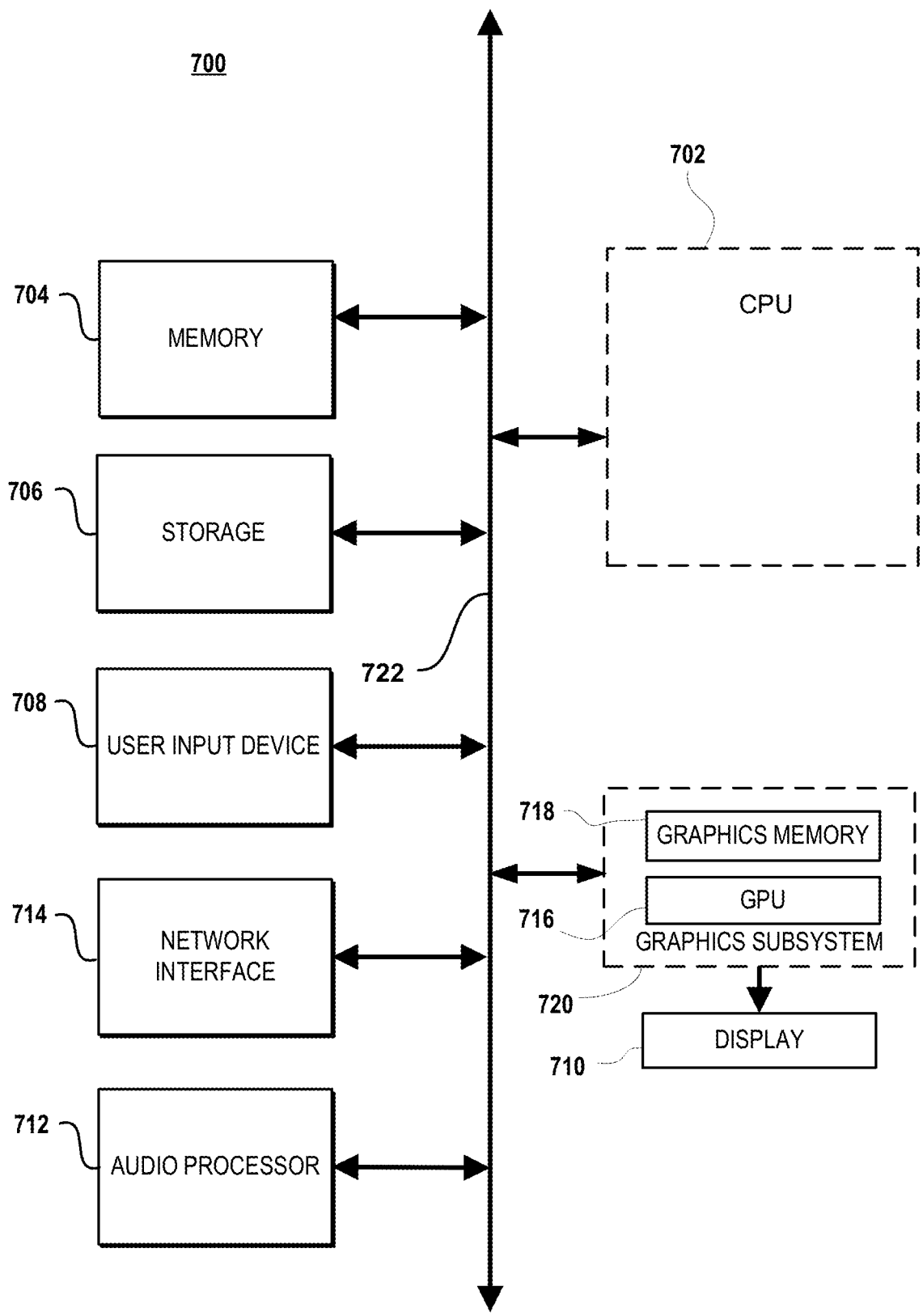
FIG. 7 illustrates components of an example computing device that can be used to perform aspects of the various implementations of the present disclosure.

FIG. 7 illustrates components of an example device 700 that can be used to perform aspects of the various embodiments of the present disclosure. This block diagram illustrates a device 700 that can incorporate or can be a personal computer, video game console, personal digital assistant, a head mounted display (HMD), a wearable computing device, a laptop or desktop computing device, a server or any other digital device, suitable for practicing an embodiment of the disclosure. For example, the device 700 represents a first device as well as a second device in various implementations discussed herein. Device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be localized to a player playing a game segment (e.g., game console), or remote from the player (e.g., back-end server processor), or one of many servers using virtualization in a game cloud system for remote streaming of game play to client devices.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 714, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 720 periodically outputs pixel data for an image from graphics memory 718 to be displayed on display device 710. Display device 710 can be any device capable of displaying visual information in response to a signal from the device 700, including CRT, LCD, plasma, and OLED displays. In addition to display device 710, the pixel data can be projected onto a projection surface. Device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play/replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD, the real-world objects, and inertial sensor data from the Inertial Motion Unit (IMU) sensors, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

As noted, embodiments of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for verifying an input provided at a controller, comprising:
   detecting a finger gesture provided by a user on a surface of the controller, the finger gesture used to define the input for an interactive application selected for interaction by the user;
   receiving multi-modal data collected by tracking the finger gesture on the controller, the multi-modal data including modal data corresponding to different modes captured for the finger gesture using a plurality of sensors and components associated with the controller;
   assigning a weight to modal data for each mode included in the multi-modal data and using the weight assigned to each modal data in computing a cumulative weight of the multi-modal data captured for the finger gesture;
   generating an ensemble model using the multi-modal data received from the plurality of sensors and components, the ensemble model continuously trained using additional multi-modal data collected over time to generate different outputs, the ensemble model trained in accordance to training rules defined for different finger gestures using machine learning algorithm; and
   identifying an output from the ensemble model for the finger gesture detected on the surface of the controller, the output identified using the cumulative weight computed for the multi-modal data of the finger gesture, the output is interpreted to define the input for the interactive application based on the finger gesture detected at the controller,
   wherein operations of the method are performed by a processor of a server.

2. The method of claim 1,
   wherein the weight assigned for said each modal data captured by a sensor or a component of the plurality of sensors and components is indicative of accurate prediction of the finger gesture using said each modal data.

3. The method of claim 2, wherein the weight assigned to said modal data captured by each sensor of the plurality of sensors and components is greater than the weight assigned to said modal data captured by each component of the plurality of sensors and components, and
   wherein the weight assigned to said modal data captured by the plurality of sensors is equal and the weight assigned to said modal data captured by the plurality of components is equal.

4. The method of claim 2, wherein said modal data captured for different modes included in the multi-modal data is assigned equal weight.

5. The method of claim 2, wherein said modal data captured for said each mode included in the multi-modal data is assigned a distinct weight.

6. The method of claim 1, wherein the ensemble model is trained in accordance to training rules defined for the different finger gestures, wherein the training rules are defined based on finger anatomy, position of fingers in relation to input controls on the controller, and controller holding style of the user.

7. The method of claim 1, wherein the multi-modal data includes video data, audio data, image data, sensors data and wireless signals collected from the plurality of sensors and components, and
   wherein identifying the output includes identifying a real-button press or a virtual-button press on the controller, or an input provided on a touch-screen interface, based on said finger gesture, said output interpreted to define the input for the interactive application.

8. The method of claim 1, wherein the plurality of sensors includes any one or a combination of inertial measurement unit (IMU) sensors, or pressure sensors, or proximity sensors, or distance sensors, or capacitive sensors, and
   wherein the plurality of components include image capturing devices, or wireless communication devices, or a microphone array.

9. The method of claim 1, wherein the multi-modal data includes WiFi signals including forward signals and reflective signals captured by the one or more wireless communication devices, the forward signals and the reflective signals interpreted to define snapshots of body parts of the user, the snapshots of body parts used in reconstructing movement of one or more fingers of the user when the user is providing the finger gesture.

10. The method of claim 1, wherein the plurality of sensors and components includes an image capturing device,
    wherein the multi-modal data includes images of different positions held by fingers of the user captured by the image capturing device when the user is providing the finger gesture, an angle of the image capturing device dynamically adjusted to capture images of different positions of the fingers, the dynamic adjustment is performed by automatically calibrating angle of the image capturing device in response to detecting presence of the fingers and the finger gesture provided by the user on the controller.

11. The method of claim 10, wherein the image capturing device is a camera that is integrated in a mobile computing device, or a webcam, or an image capturing device of a game console, or an image capturing device of a computing device or a camera of a head mounted display, wherein the image capturing device is communicatively coupled to the controller.

12. The method of claim 11, wherein when the image capturing device is the camera of the mobile computing device, the mobile computing device is disposed on a holding structure coupled to the controller, the holding structure including motors configured to receive and hold the mobile computing device and to dynamically adjust an angle of the camera to align with the angle calibrated to enable capturing images of different positions held by the fingers of the user when the user is performing finger gesture, and wherein the holding structure is a three-dimensional printed structure.

13. The method of claim 1, wherein the plurality of sensors and components includes one or more of inertial measurement unit sensors (IMUs), the IMUs configured to detect finger gestures of the user on the surface of the controller and generate IMU signals, and wherein the multi-modal data includes the IMU signals received from the one or more IMUs, the IMU signals interpreted to identify attributes of the finger gestures, the attributes used to identify user inputs at the controller.

14. The method of claim 1, wherein the plurality of sensors and components includes a microphone array embedded within the controller or coupled to the controller, wherein the finger gesture is a button press on the controller, and wherein the multi-modal data includes attributes of audio data captured by the microphone array, the attributes of the audio data captured by a plurality of microphones in the microphone array interpreted, using triangulation technique, to identify direction and location of sound in relation to each microphone in the microphone array, and to use the direction and the location to determine the button pressed.

15. A method for defining an input for an interactive application, comprising:

receiving a finger gesture provided by a user on a surface of a controller, wherein the finger gesture is used to define the input for the interactive application selected for interaction by the user;

receiving multi-modal data capturing attributes of the finger gesture on the controller, the multi-modal data including modal data corresponding to different modes captured by a plurality of sensors and components associated with the controller;

assigning a weight to modal data corresponding to each mode included in the multi-modal data, the weight assigned for each mode indicative of accurate prediction of the finger gesture using said modal data of said each mode; and processing the finger gesture and the multi-modal data based on the weight assigned to each mode, wherein the weight assigned to each mode of the multi-modal data is used in computing a cumulative weight for said multi-modal data, the cumulative weight used to identify the input for the interactive application, wherein operations of the method are performed by a processor of a server.

16. The method of claim 15, wherein the processing of the finger gesture and the multi-modal data includes, generating an ensemble model using the multi-modal data received from the plurality of sensors and components;

training the ensemble model continuously using additional multi-modal data collected over time to generate different outputs, the ensemble model trained in accordance to training rules defined for different finger gestures using machine learning algorithm; and identifying an output from the ensemble model that corresponds to the finger gesture detected on the surface of the controller, the output interpreted to define the input for the interactive application.

17. The method of claim 16, wherein the training rules are defined based on finger anatomy, position of fingers in relation to input controls on the controller, and controller-holding style of the user.

18. The method of claim 15, wherein the plurality of sensors includes anyone or a combination of inertial measurement unit (IMU) sensors, or distance sensors, or pressure sensors, or proximity sensors or capacitive sensors, wherein the plurality of components includes anyone or combination of image capturing devices, or wired communication devices, or wireless communication devices, or microphone array.

19. The method of claim 15, wherein the multi-modal data includes a first set of said modal data captured by the plurality of sensors and a second set of said modal data captured by said plurality of components, and wherein assigning the weight includes assigning a first weight to the modal data for said each mode included in the first set of modal data and a second weight to the modal data for said each mode included in the second set of modal data, wherein the first weight is greater than the second weight.

* * * * *